(12) United States Patent
Inada et al.

(10) Patent No.: US 8,653,412 B2
(45) Date of Patent: Feb. 18, 2014

(54) ARC WELDING SYSTEM, SINGLE ARC WELDING SYSTEM, AND TANDEM ARC WELDING SYSTEM

(75) Inventors: Shuichi Inada, Fujisawa (JP); Yoshihide Inoue, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 464 days.

(21) Appl. No.: 12/911,362

(22) Filed: Oct. 25, 2010

(65) Prior Publication Data

US 2011/0108536 A1    May 12, 2011

(30) Foreign Application Priority Data

Nov. 6, 2009    (JP) ................................ 2009-254881

(51) Int. Cl.
*B23K 9/10*    (2006.01)

(52) U.S. Cl.
USPC ...................... 219/130.01; 219/124.22; 901/2

(58) Field of Classification Search
USPC ............... 219/130.1, 130.12, 130.21, 130.31, 219/130.33, 124.32, 124.33, 124.1; 700/212; 901/2, 42; 228/102, 8, 11
See application file for complete search history.

(56) References Cited

U.S. PATENT DOCUMENTS

| | | | |
|---|---|---|---|
| 2004/0045945 A1 * | 3/2004 | Shimogama et al. | 219/130.5 |
| 2008/0083705 A1 * | 4/2008 | Peters | 219/61 |
| 2008/0083716 A1 | 4/2008 | Shigeyoshi | |

FOREIGN PATENT DOCUMENTS

| | | | |
|---|---|---|---|
| JP | 61-95780 | | 5/1986 |
| JP | 61-212479 | | 9/1986 |
| JP | 61212479 A | * | 9/1986 |
| JP | 8-323468 | | 12/1996 |
| JP | 08323468 A | * | 12/1996 |
| JP | 9-1337 | | 1/1997 |
| JP | 09001337 A | * | 1/1997 |
| JP | 2001-92506 | | 4/2001 |
| JP | 2001092506 A | * | 4/2001 |
| JP | 2002-144036 | | 5/2002 |
| JP | 2002144036 A | * | 5/2002 |
| JP | 2003-53535 | | 2/2003 |
| JP | 2003053535 A | * | 2/2003 |
| JP | 2003-103366 | | 4/2003 |
| JP | 2005-284508 | | 10/2005 |
| JP | 2005284508 A | * | 10/2005 |
| JP | 2008-93670 | | 4/2008 |

OTHER PUBLICATIONS

Embedded Systems Course—serial communication basics, http://web.archive.org/web/20080920031028/http://www.eeherald.com/section/design-guide/esmod7.html, Sep. 20, 2008.*
Extended Search Report issued Mar. 2, 2011 in Europe Application No. 10014349.4.

(Continued)

*Primary Examiner* — Dana Ross
*Assistant Examiner* — John J Norton
(74) *Attorney, Agent, or Firm* — Oblon, Spivak, McClelland, Maier & Neustadt, L.L.P.

(57) ABSTRACT

An arc welding system according to the present invention includes a welding power supply for supplying welding power to a welding wire, a welding robot including a welding torch mounted to an arm fore end thereof, and a controller for controlling the welding power supply and the welding robot. The welding power supply and the controller perform communication using digital signals, and the welding power supply outputs, to the controller, a welding power-supply feedback signal obtained at the time of inputting of a welding power-supply sync signal. With that configuration, accurate arc tracking can be realized by using the digital signals.

4 Claims, 9 Drawing Sheets

(56) References Cited

OTHER PUBLICATIONS

Japanese Office Action issued Dec. 20, 2011, in Patent Application No. 2009-254881 (with English-language translation).

Korean Office Action issued Jun. 18, 2012 in Patent Application No. 2010-0107981 with English Translation.

Notification of Reason(s) for Refusal issued Oct. 2, 2012 in Japanese Patent Application No. 2009-254881.

\* cited by examiner

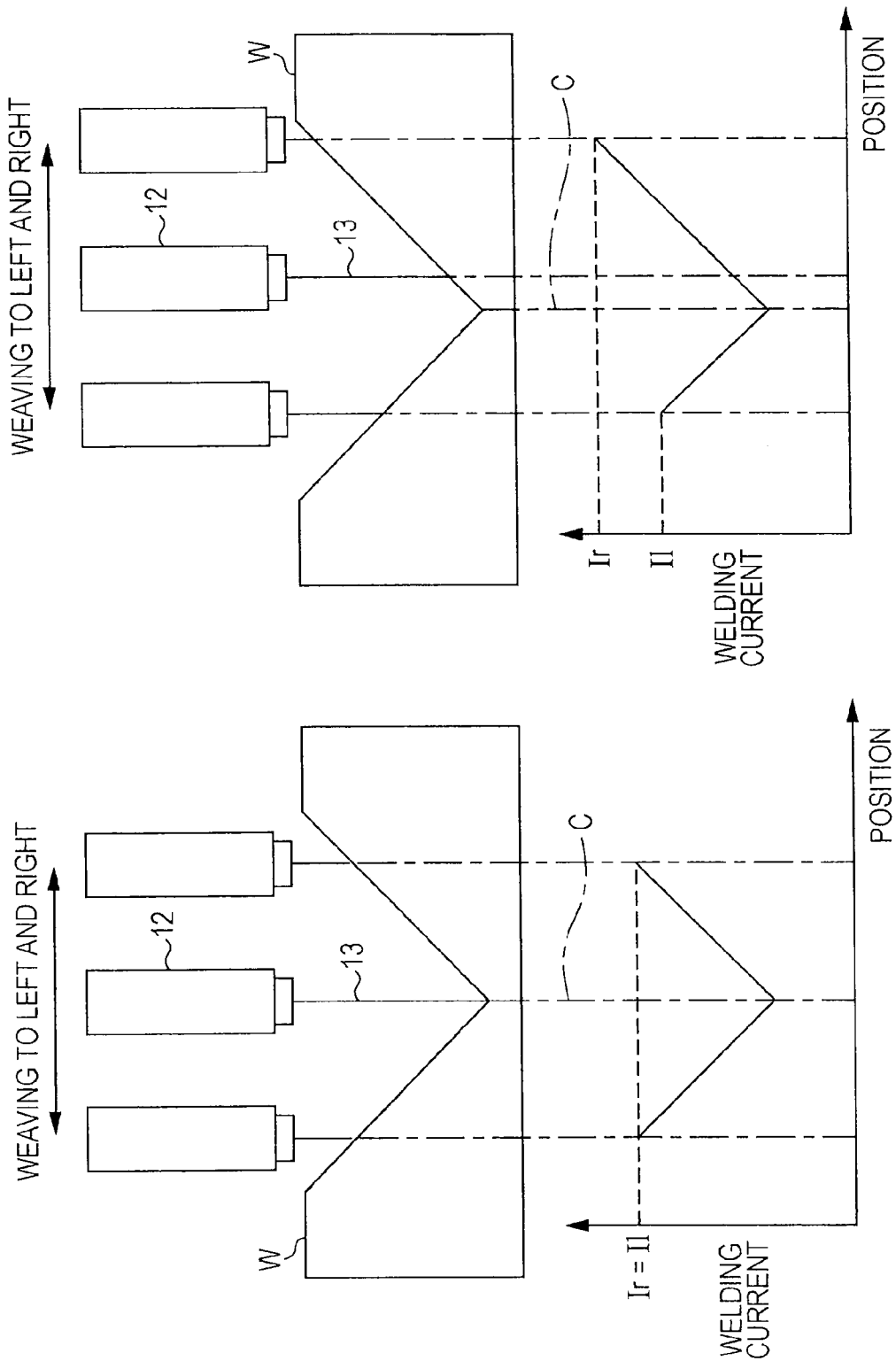

ARC WELDING SYSTEM, SINGLE ARC WELDING SYSTEM, AND TANDEM ARC WELDING SYSTEM

BACKGROUND OF THE INVENTION

1. Field of the Invention

The present invention relates to an arc welding system in which arc welding is carried out while a welding torch of a welding robot is weaved.

2. Description of the Related Art

When arc welding is carried out on a work, such as a thick plate, along a welding line by using a welding robot, a welding torch of the welding robot is weaved to the left and the right. To realize the arc welding with good quality in such a case, it is essential to detect a position deviation between the welding torch and the welding line on the work, and to perform the arc tracking while correcting the position of the welding torch such that the welding torch tracks the welding line (e.g., Japanese Unexamined Patent Application Publication No. 61-095780 and No. 2008-093670).

The arc tracking will be described in brief below in connection with an illustration of a known arc welding system 9 by referring to FIG. 9. As illustrated in FIG. 9, the arc welding system 9 includes a welding robot 91, a welding power supply 92, and a controller 93.

The welding robot 91 is, e.g., an arc welding robot such as a 6-axis vertical articulated robot. A welding torch 91a is mounted to an arm fore end of the welding robot 91. Further, a welding wire 91b is fed to the welding torch 91a by a welding-wire feed motor (not shown).

The welding power supply 92 is a power supply for supplying a welding current to the welding wire 91b. Further, the welding power supply 92 communicates with the controller 93 via an analog communication path An by using an analog signal. The term "analog signal" used in the present invention means a signal obtained by continuously converting data to a voltage level.

The controller 93 is a control device for controlling the welding robot 91 and the welding power supply 92. Further, the controller 93 includes a tracking control unit 93a to perform the arc tracking.

With such a configuration, the arc welding system 9 carries out arc welding on a work W in a state that arc discharge is generated between the work W and the welding wire 91b by the welding current supplied from the welding power supply 92, while the welding torch 91a is moved over the welding line by the welding robot 91. During the welding, the tracking control unit 93a in the arc welding system 9 detects a position deviation of the work W and corrects the fore end position of the welding torch 91a for the purpose of arc tracking.

Recently, users of the above-described arc welding system have strongly demanded makers of welding robots to realize more upgrading of practical techniques in the arc welding and more sophisticated functions of arc welding machines. When the makers of welding robots try to satisfy those demands, it is indispensable to accurately communicate a larger amount of data between a robot controller and a welding power supply.

In trying to communicate a larger amount of information in the known arc welding system 9 that performs communication using analog signals as illustrated in FIG. 9, however, the communication path An for the analog signal needs to be increased in number whenever a new type of signal (e.g., a universal signal for detection of abnormality) is added. This gives rise to the problem that cable wiring is complicated and reliability of the communication is reduced.

Communication using digital signals is inevitable to solve the above-mentioned problem. However, the use of the digital communication gives rise to another problem that a delay is caused in the communication and accuracy in the arc tracking is reduced in comparison with the communication using analog signals.

To cope with those problems, the invention described in Japanese Unexamined Patent Application Publication No. 2003-103366 enables real-time performance to be improved by interconnecting various control units through a parallel bus system and by performing communication using digital signals. However, the digital communication with the parallel bus connection greatly increases the number of communication paths and hence reduces reliability of the communication. Further, if missing of signal data (e.g., missing of bits) occurs, a complicated recovery process and an abnormality detection process are required. In addition, because the parallel bus system is susceptible to noises, a cable length has to be held relatively short, e.g., several meters or less. System layout, etc. are thereby restricted in designing the configuration of the arc welding system. Particularly, system layout, etc. are very restricted when the welding is carried out by using a plurality of power supplies connected to each other.

An object of the present invention is to solve the problems described above and to provide an arc welding system in which digital communication can be performed with increased communication reliability, system layout can be designed at relatively high flexibility, and accurate arc tracking can be ensured.

SUMMARY OF THE INVENTION

To solve the problems mentioned above, an arc welding system according to the present invention comprise a welding robot; a welding torch mounted to an arm fore end of the welding robot; a welding power supply connected to the welding torch and supplying welding power to a welding wire; and a controller for controlling the welding power supply, wherein the welding power supply includes a welding current detection unit for detecting a welding current value of the welding wire and outputting a welding current value detection signal representing the welding current value; a welding power supply interface for receiving, from the controller, a welding power-supply control signal to control the welding power supply and a welding power-supply sync signal that is supplied as a sync signal to the welding power supply at intervals of certain time, receiving the welding current value detection signal from the welding current detection unit, and outputting to the controller, as a welding power-supply feedback signal, the welding current value detection signal obtained at the time of inputting of the welding power-supply sync signal; and a welding power supply output unit for outputting the welding power in accordance with the welding power-supply control signal input through the welding power supply interface, wherein the controller includes a controller interface for receiving the welding power-supply feedback signal from the welding power supply, and outputting the welding power-supply control signal and the welding power-supply sync signal to the welding power supply; a servo amplifier for controlling driving of the welding robot in accordance with a robot control signal for controlling the welding robot, and outputting a robot feedback position signal representing a position of the welding torch at the time of inputting of a robot sync signal as a sync signal for the welding robot; and a robot welding power-supply control unit for generating the welding power-supply sync signal and the robot sync signal, outputting the welding power-supply sync signal and the welding power-supply control signal to the controller interface, detecting a position deviation of the welding torch from the welding power-supply feedback signal and the robot feedback position signal both input during arc welding, generating the robot control signal to correct the position deviation of the welding torch, and outputting the generated robot control signal to the servo amplifier, and wherein the welding power supply and the controller are connected in a serial way and communicate with each other using digital signals.

With such a configuration, since the arc welding system according to the present invention performs the communication using digital signals in a serial way, a single line of communication path is just required and high reliability can be ensured in the communication.

Also, since the arc welding system according to the present invention is highly resistant against noises, an allowable cable length can be increased.

Further, since the arc welding system according to the present invention employs the welding power-supply sync signal and the robot sync signal such that the sampling intervals of the respective feedback signals are always held constant, synchronous control can be realized in the arc tracking.

The term "digital signal" used in the present invention means a signal expressing data as a discrete value.

Also, the term "sampling interval" used in the present invention means an interval (time interval) between a time when one of continuous data (analog signal) is acquired and a time when the last data has been acquired.

In the arc welding system according to the present invention, the welding power supply interface may further receive a welding voltage value detection signal detected by a welding voltage detection unit and representing a welding voltage value of the welding wire, and may output to the controller, as the welding power-supply feedback signal, at least one of the welding current value detection signal and the welding voltage value detection signal each obtained at the time of inputting of the welding power-supply sync signal.

With such a configuration of the arc welding system according to the present invention, since the welding power supply detects the welding voltage and outputs the welding voltage value detection signal, the welding voltage value can be used in the arc tracking.

The arc welding system according to the present invention may be a single arc welding system in which the welding torch mounted to the arm fore end of the welding robot is single.

The arc welding system according to the present invention may be a tandem arc welding system in which the welding torch mounted to the arm fore end of the welding robot comprises a first welding torch and a second welding torch behaving in a similar manner to the first welding torch. In such a tandem arc welding system, the welding power supply is provided two or more, including at least a first welding power supply and a second welding power supply, the first welding power supply connected to the first welding torch supplies the welding power to the welding wire as a first one and performs communication using digital signals with respect to the controller in a serial way, the second welding power supply connected to the second welding torch supplies the welding power to a second welding wire and performs communication using digital signals with respect to the controller in a serial way. The controller controls the welding robot, the first welding power supply, and the second welding power supply.

With the above-described configuration in which the present invention is applied to the tandem arc welding system, since the communication is performed using digital signals in a serial way, the second welding power supply can be easily added with simple wiring, and the welding power-supply feedback signals for the first welding power supply and the second welding power supply can be synchronized with each other. As a result, the tandem arc welding system can be provided in which the hardware configuration is flexible, the cost is relatively low, and accurate arc tracking is ensured.

According to the present invention, since the communication is performed using digital signals in a serial way, highly reliable communication can be realized. Also, according to the present invention, since the allowable cable length is increased, the system layout can be designed at a high degree of freedom. Further, according to the present invention, as a result of performing synchronous control in the arc tracking, accurate arc tracking can be carried out even in a serial system in which real-time performance is inferior to a parallel system.

In addition, according to the present invention, since a single line of communication path is employed and communication reliability is high, time and labor required for the complicated recovery process can be greatly reduced even if missing of signal data occurs, and frequency of the abnormality detection process can also be reduced.

BRIEF DESCRIPTION OF THE DRAWINGS

FIGS. 2A and 2B are illustrations to explain detection and correction of a position deviation of a welding torch with arc tracking in the arc welding system of FIG. 1; specifically, FIG. 2A illustrates the case where the welding torch is aligned with a welding center, and FIG. 2B illustrates the case where the welding torch is deviated to the right from the welding center;

FIG. 3A illustrates the case where the welding torch is positioned at a reference height, and FIG. 3B illustrates the case where the welding torch is positioned at a level higher than the reference height;

DESCRIPTION OF THE PREFERRED EMBODIMENTS

Figure 1:
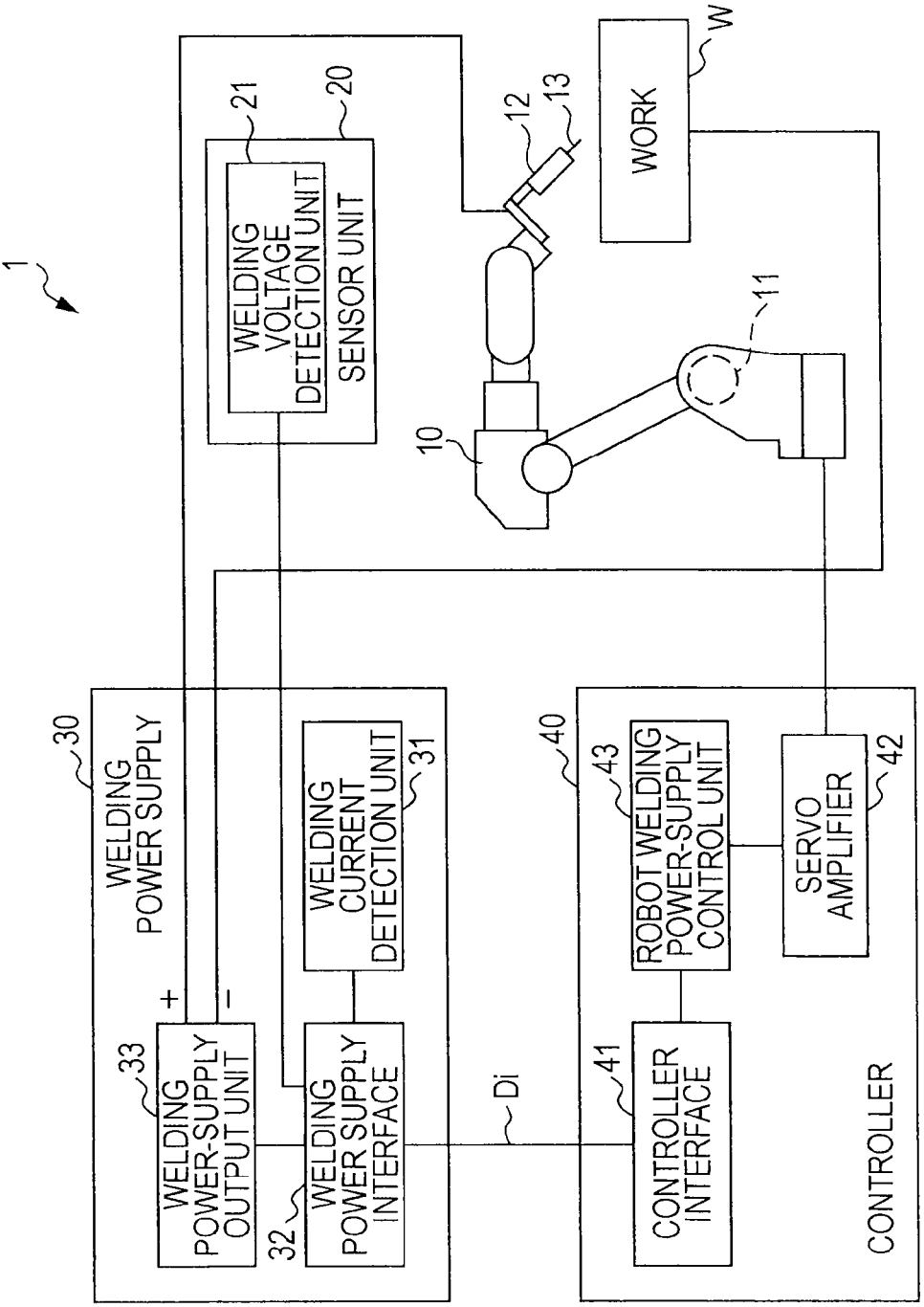
FIG. 1 is a block diagram illustrating configuration of an arc welding system according to a first embodiment of the present invention.

Embodiments of the present invention will be described in detail below by referring to the drawings as required. Be it noted that means having the same functions in the embodiments are denoted by the same characters and the description of those means are not repeated.

First Embodiment

[Configuration of Arc Welding System: Single Arc Welding]

The configuration of an arc welding system according to a first embodiment of the present invention is described with reference to FIG. 1. As illustrated in FIG. 1, the arc welding system 1 is to carry out single arc welding, and it includes a welding robot 10, a sensor unit 20, a welding power supply 30, and a controller 40.

The welding robot 10 is an arc welding robot such as a 6-axis vertical articulated robot. When a motor drive signal is input to the welding robot 10 from a later-described servo amplifier 42, a built-in servo motor 11 is driven and the welding robot 10 is moved to be able to take a desired posture. The desired arc welding operation can be performed by mounting a welding torch 12 to an arm fore end of the welding robot 10, and by feeding a welding wire 13 to the welding torch 12 by a welding-wire feed motor (not shown). Be it noted that, for simplicity of explanation, only one servo motor 11 is illustrated in FIG. 1.

The sensor unit 20 includes a welding voltage detection unit 21. The welding voltage detection unit 21 detects a welding voltage that is applied to the welding wire 13 by a later-described welding power-supply output unit 33, and outputs a detected value of the welding voltage, as a welding voltage value detection signal, to a welding power supply interface 32. The sensor unit 20 may additionally have the function of a shock sensor for detecting contact of the welding torch 12 against a work W, etc. Further, the sensor unit 20 may include an electromagnetic contactor (not shown) for opening and closing an electrical circuit. The electromagnetic contactor can instantaneously cut off the supply of power to the welding wire 13 and can stop the arc welding operation at once.

The welding power supply 30 supplies the welding power to the welding wire 13, and it includes a welding current detection unit 31, the welding power supply interface 32, and the welding power-supply output unit 33. The welding voltage detection unit 21 may be included in the welding power supply 30.

The welding current detection unit 31 detects the welding current that is applied to the welding wire 13 by the welding power-supply output unit 33, and outputs a detected value of the welding current, as a welding current value detection signal, to the welding power supply interface 32.

The welding power supply interface 32 performs communication using digital signals with respect to a later-described controller interface 41 via a digital communication path Di. More specifically, the welding power supply interface 32 receives a welding power-supply control signal and a welding power-supply sync signal (described later) both input through the controller interface 41. Further, the welding power supply interface 32 latches and acquires the welding current value detection signal output from the welding current detection unit 31 and the welding voltage value detection signal output from the welding voltage detection unit 21, for example, at the timing of inputting the welding power-supply sync signal. Here, the term "latch" means an operation of capturing and holding data (e.g., a current value or a voltage value) at a certain time.

Moreover, the welding power supply interface 32 outputs the latched welding current value detection signal and welding voltage value detection signal, as welding power-supply feedback signals, to the controller interface 41. Here, the welding power supply interface 32 may use the welding voltage detection signal as the welding power-supply feedback signal. Alternatively, the welding power supply interface 32 may use both of the current and the voltage.

In addition, the welding power supply interface 32 outputs the input welding power-supply control signal to the welding power-supply output unit 33.

The welding power-supply control signal is a signal for controlling the welding power supply 30 and indicates, e.g., a welding current command value and a welding voltage command value both output from the welding power-supply output unit 33.

The welding power-supply sync signal is a signal that is applied to the welding power supply interface 32 and that indicates the timing at which the welding power supply interface 32 acquires the welding current value detection signal and the welding voltage value detection signal.

The welding power-supply output unit 33 outputs the welding power to the welding wire 13 in accordance with the welding power-supply control signal input through the welding power supply interface 32. More specifically, the welding power-supply output unit 33 makes control such that the welding current and the welding voltage between the work W and the welding wire 13 take the welding current command value and the welding voltage command value indicated by the welding power-supply control signal, respectively.

As illustrated in FIG. 1, one of power supply cables extending from the welding power-supply output unit 33 is connected to the welding torch 12. Also, the other power supply cable extending from the welding power-supply output unit 33 is connected to the work W.

The controller 40 controls the welding robot 10 and the welding power supply 30, and it includes the controller interface 41, a servo amplifier 42, and a robot welding power-supply control unit 43.

The controller interface 41 performs communication using digital signals with respect to the welding power supply interface 32 via the digital communication path Di. More specifically, the controller interface 41 temporarily stores a welding power-supply feedback signal, which is output from the welding power supply interface 32, in a DPRAM (not shown) that serves as a buffer memory. Then, the controller interface 41 outputs the welding power-supply feedback signal from the DPRAM at constant intervals.

Further, the controller interface 41 outputs the welding power-supply control signal, which is output from the robot welding power-supply control unit 43, to the welding power supply interface 32.

The welding power supply interface 32 and the controller interface 41 utilize ControllerAreaNetwork (abbreviated to "CAN" hereinafter) to perform the communication using digital signals. In that case, the welding power supply interface 32 and the controller interface 41 put the welding power-supply control signal in a frame that is transmitted and received at constant intervals. As a result, the arc welding system 1 can suppress an event of generating a new frame and transmitting it and hence can increase communication efficiency. Although the interval in the transmission and the reception may be optionally set, satisfactory arc tracking can be realized with the interval of several to several tens milliseconds. The term "frame" used in the present invention is expressed in the form of a bit train holding collected various data. In the CAN, for example, there are a data frame, a remote frame, etc.

The servo amplifier 42 drives the servo motor 11 for operating an articulation of the welding robot 10 in accordance with a robot control signal from the robot welding power-supply control unit 43. Further, the servo amplifier 42 outputs, to the robot welding power-supply control unit 43, a robot feedback position signal indicating the position of the welding torch 12.

The robot control signal is a signal for controlling the welding robot 10. Thus, the robot control signal is a motor driving parameter of which value is determined by the robot welding power-supply control unit 43 depending on not only the position of the welding torch 12, but also command values for a weaving operation (including, e.g., the weaving direction, the weaving cycle, and the weaving width).

A robot sync signal is a sync signal that is supplied to the welding robot 10 and that indicates the timing at which the servo amplifier 42 obtains the robot feedback position signal.

The robot welding power-supply control unit 43 performs detection and correction of a position deviation of the welding torch 12 with arc tracking described later, and it generates various signals necessary for controlling the welding robot 10 and the welding power supply 30. For example, an operator of the arc welding system 1 operates a teach pendant (not shown) so as to move the welding torch 12 from a welding start position to a welding end position, thereby teaching operating positions of the welding torch 12 during the arc welding to the robot welding power-supply control unit 43. Then, the operator of the arc welding system 1 manually sets the command values for the welding current, the welding voltage, and the weaving operation, etc. Further, when the arc welding is carried out, the robot welding power-supply control unit 43 generates the robot control signal in accordance with the position of the welding torch and the command values for the weaving operation, and outputs the robot control signal to the servo amplifier 42. In addition, the robot welding power-supply control unit 43 generates the welding power-supply control signal indicating the welding current command value and the welding voltage command value, which have been set by the user, and outputs the welding power-supply control signal to the controller interface 41.

Also, the robot welding power-supply control unit 43 generates the welding power-supply sync signal at predetermined intervals and outputs it to the controller interface 41. Further, the robot welding power-supply control unit 43 generates the robot sync signal at predetermined intervals and outputs it to the servo amplifier 42. On that occasion, the robot welding power-supply control unit 43 may output the welding power-supply sync signal and the robot sync signal at the same interval or at different intervals.

<Detection and Correction of Position Deviation of Welding Torch with Arc Tracking>

In addition to the operations described above, the robot welding power-supply control unit 43 performs the arc tracking by detecting the position deviation of the welding torch 12 with respect to a welding center, and by generating the robot control signal to correct the position deviation. Details of the detection and the correction of the position deviation of the welding torch with the arc tracking will be described below by referring to FIGS. 2 and 3 (as well as to FIG. 1 as required).

Left-and-right tracking to correct the position deviation of the welding torch 12 in the left-and-right direction with respect to a welding line is described with reference to FIGS. 2A and 2B. More specifically, the robot welding power-supply control unit 43 detects the welding current while the welding torch 12 is weaved, and further detects the position of the welding torch 12 in the left-and-right direction by utilizing the fact that a length by which the welding wire 13 is projected is inversely proportional to the welding current.

An upper stage of each of FIGS. 2A and 2B illustrates the welding torch 12 and the work W, which are relatively weaved to the left and the right. The position of the welding torch 12 is determined from the above-mentioned robot feedback position signal. A lower stage of each of FIGS. 2A and 2B illustrates a detected value (solid line) of the welding current represented by the welding power-supply feedback signal during a period in which the welding torch 12 in the upper stage of each of FIGS. 2A and 2B is weaved from the left end to the right end.

When the welding torch 12 is weaved symmetrically in the left-and-right direction with respect to a welding center C as illustrated in the upper stage of FIG. 2A, a left-end welding current Il detected at the left end of the weaving and a right-end welding current Ir detected at the right end of the weaving are equal to each other as illustrated in the lower stage of FIG. 2A. On the other hand, when the welding torch 12 is deviated to the right from the welding center C as illustrated in the upper stage of FIG. 2B, the right-end welding current Ir has a larger value than that of the left-end welding current Il as illustrated in the lower stage of FIG. 2B.

In such a case, the robot welding power-supply control unit 43 generates the robot control signal to correct the position deviation of the welding torch 12 such that the left-end welding current Il and the right-end welding current Ir become equal to each other. Though not illustrated, when the welding torch 12 is deviated to the left from the welding center C, the robot welding power-supply control unit 43 similarly generates the robot control signal to correct the position deviation of the welding torch 12, as in the case of FIG. 2B, such that the left-end welding current Il and the right-end welding current Ir become equal to each other.

Up-and-down tracking to correct the position deviation of the welding torch 12 in the up-and-down direction is described with reference to FIGS. 3A and 3B. More specifically, the robot welding power-supply control unit 43 calculates a mean value of the welding current (i.e., a welding-current mean value) that is generated with the welding torch 12 moving up and down due to the weaving during the arc welding, and further detects the position of the welding torch 12 in the up-and-down direction by utilizing both the welding current mean value and the welding current command value that has been set in advance.

Figure 3A:
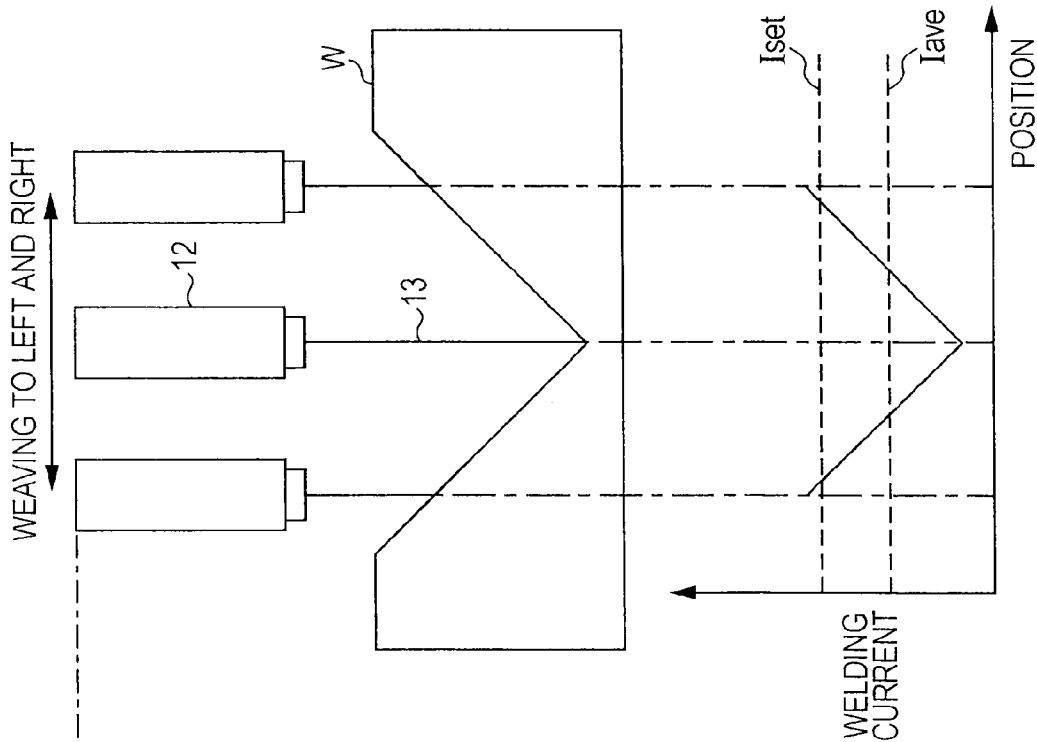
FIGS. 3A and 3B are illustrations to explain detection and correction of a position deviation of the welding torch with the arc tracking in the arc welding system of FIG. 1; specifically.
Figure 3B:
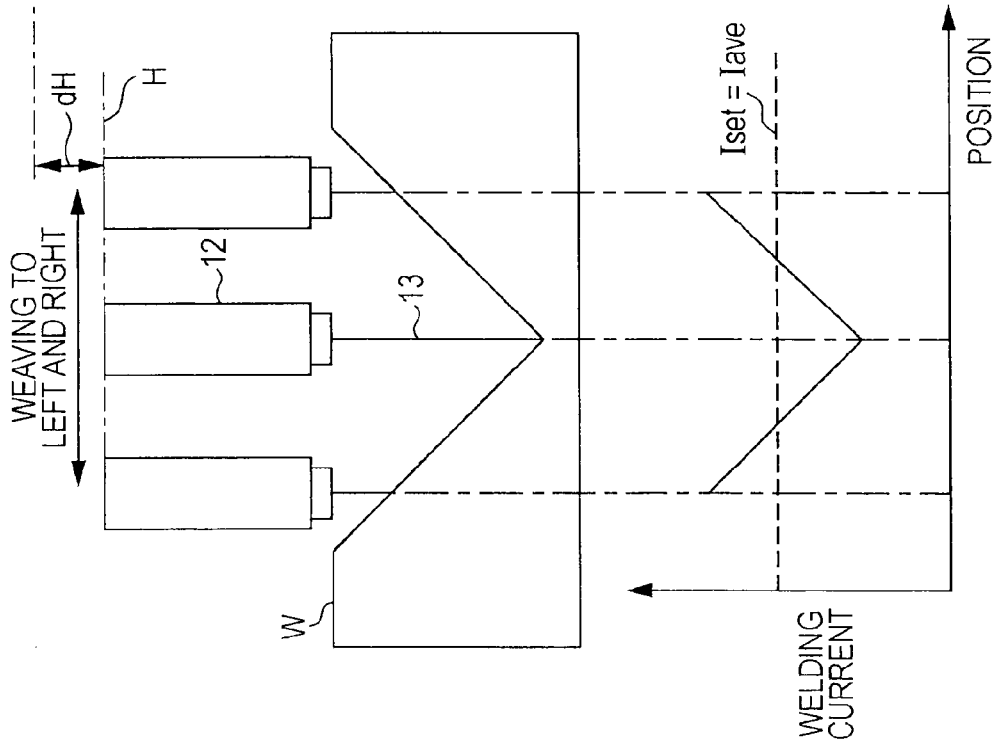

An upper stage of each of FIGS. 3A and 3B illustrates the welding torch 12 and the work W, which are relatively weaved to the left and the right. A lower stage of each of FIGS. 3A and 3B illustrates a detected value (solid line) of the welding current represented by the welding power-supply feedback signal, a welding current command value Iset, and a welding current average value Iave resulting from averaging the detected values of the welding current during a period in which the welding torch 12 in the upper stage of each of FIGS. 3A and 3B is weaved from the left end to the right end.

When the welding torch 12 is positioned at a predetermined reference height H as illustrated in the upper stage of FIG. 3A, the welding current average value Iave and the welding current command value Iset are equal to each other as illustrated in the lower stage of FIG. 3A. On the other hand, when the welding torch 12 is positioned at a level higher than the reference height H by a height dH as illustrated in the upper stage of FIG. 3B, the welding current average value Iave is smaller value than the welding current command value Iset as illustrated in the lower stage of FIG. 3B. Be it noted that the reference height H means the height of the welding torch 12 commanded by the robot control signal, for example.

In such a case, the robot welding power-supply control unit 43 generates the robot control signal to correct the position deviation of the welding torch 12 such that the welding current average value Iave and the welding current command value Iset become equal to each other. Though not illustrated, when the welding torch 12 is positioned at a level lower than the reference height H, the robot welding power-supply control unit 43 similarly generates the robot control signal to correct the position deviation of the welding torch 12, as in the case of FIG. 3B, such that the welding current average value Iave and the welding current command value Iset become equal to each other. Thus, the robot welding power-supply control unit 43 can detect and correct the position deviation of the welding torch 12 with the arc tracking illustrated in FIGS. 2A-2B and FIGS. 3A-3B.

Moreover, the robot welding power-supply control unit 43 can detect and correct the position deviation of the welding torch 12 in both the up-and-down direction and the left-and-right direction by combining the two types of arc tracking illustrated in FIGS. 2A-2B and FIGS. 3A-3B with each other. While the arc tracking using the welding current is described with reference to FIGS. 2A-2B and FIGS. 3A-3B, the arc tacking may be performed by using the welding voltage in the present invention.

[Operation of Arc Welding System: Synchronous Control]

The operation and the synchronous control of the arc welding system, illustrated in FIG. 1, will be described below with reference to FIG. 4 (and FIG. 1 as required). Be it noted that, in FIG. 4, the welding power-supply output unit 33 is abbreviated to "output unit", the welding power supply interface 32 is abbreviated to "welding power supply IF", the controller interface 41 is abbreviated to "controller IF", the robot welding power-supply control unit 43 is abbreviated to "control unit", the welding power-supply sync signal is abbreviated to "WP sync signal", and the robot sync signal is abbreviated to "R sync signal".

Figure 4:
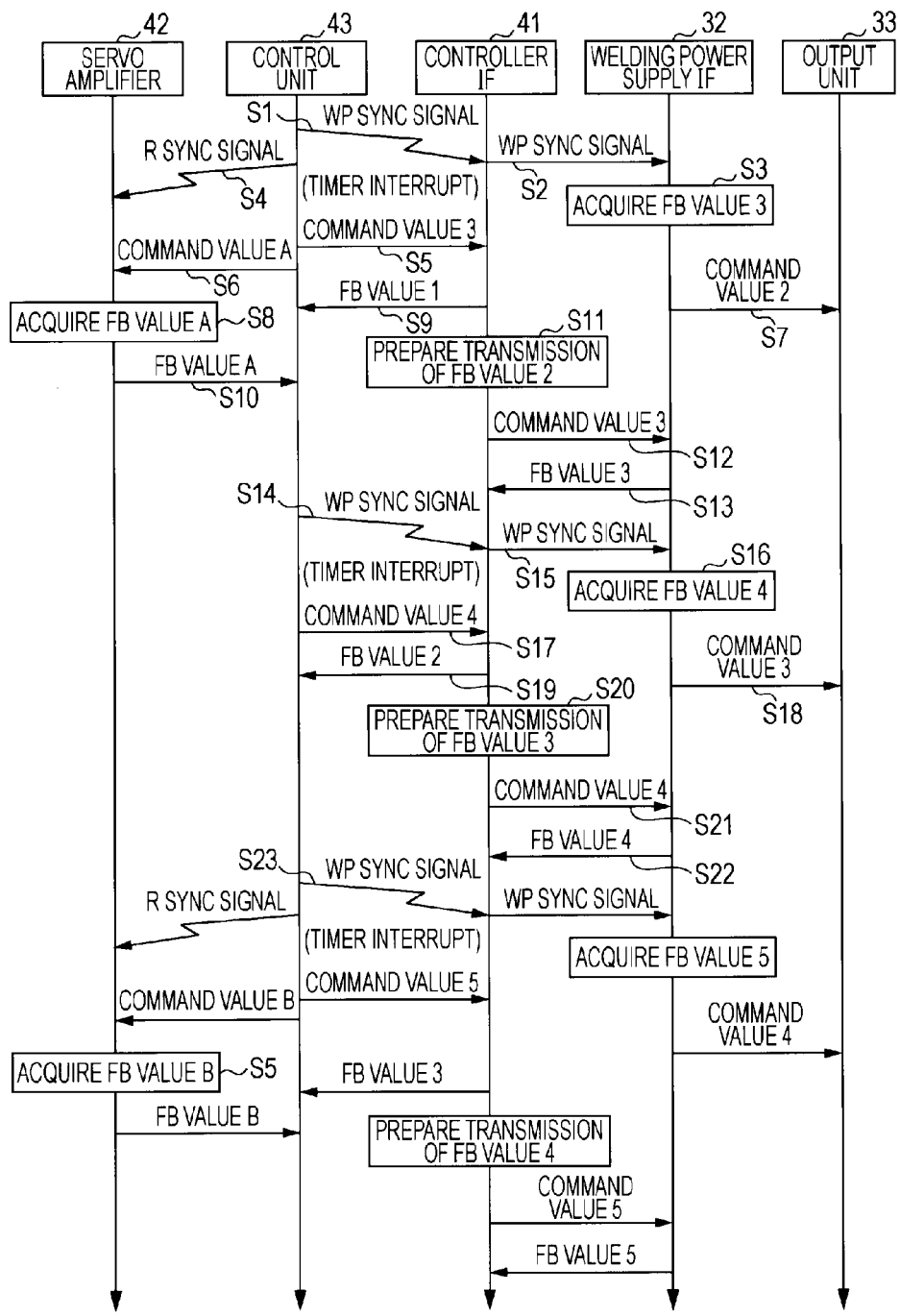
FIG. 4 is a sequence chart illustrating operations of the arc welding system of FIG. 1.

Further, in FIG. 4, each of "command value 1" to "command value 5" corresponds to the welding power-supply control signal, each of "FB value 1" to "FB value 5" corresponds to the welding power-supply feedback signal, each of "command value A" and "command value B" corresponds to the robot control signal, and each of "FB value A" and "FB value B" corresponds to the robot feedback position signal. The following description with reference to FIG. 4 is made on an assumption that the robot welding power-supply control unit 43 outputs the welding power-supply sync signal and the robot sync signal at different timings.

First, the robot welding power-supply control unit 43 outputs the welding power-supply sync signal to the controller interface 41 by generating a timer interrupt (step S1).

Following the processing of step S1, the controller interface 41 outputs the welding power-supply sync signal, which has been input in step S1, to the welding power supply interface 32 (step S2).

Following the processing of step S2, the welding power supply interface 32 acquires the welding power-supply feedback signal (FB value 3) by latching it in the buffer memory (step S3).

Following the processing of step S3, the robot welding power-supply control unit 43 outputs the robot sync signal to the servo amplifier 42 (step S4).

Following the processing of step S4, the robot welding power-supply control unit 43 outputs the welding power-supply control signal (command value 3) to the controller interface 41 (step S5).

Following the processing of step S5, the robot welding power-supply control unit 43 outputs the robot control signal (command value A) to the servo amplifier 42 (step S6). Then, the servo amplifier 42 generates a drive signal for the servo motor 11 from the robot control signal (command value A) and drives the servo motor 11, thereby moving the welding torch 12.

Following the processing of step S6, the welding power supply interface 32 outputs the welding power-supply control signal (command value 2) to the welding power-supply output unit 33 (step S7). Then, the welding power-supply output unit 33 applies the welding current and the welding voltage, which are commanded by the welding power-supply control signal (command value 2), to the welding wire 13. Be it noted that the welding power-supply control signal (command value 2) has been input to the welding power supply interface 32 before the processing of step S1.

Following the processing of step S7, the servo amplifier 42 acquires the robot feedback position signal (FB value A) (step S8).

Following the processing of step S8, the controller interface 41 outputs the welding power-supply feedback signal (FB value 1) to the robot welding power-supply control unit 43 (step S9). Be it noted that the welding power-supply feedback signal (FB value 1) has been input to the controller interface 41 before the processing of step S1.

Following the processing of step S9, the servo amplifier 42 outputs the robot feedback position signal (FB value A), which has been acquired in step S8, to the robot welding power-supply control unit 43 (step S10). Then, the robot welding power-supply control unit 43 generates the robot control signal (command value B) to correct the position deviation of the welding torch 12 by using both the welding power-supply feedback signal (FB value 1) and the robot feedback position signal (FB value A).

Following the processing of step S10, the controller interface 41 prepares transmission of the welding power-supply feedback signal (FB value 2). More specifically, the controller interface 41 stores the welding power-supply feedback signal (FB value 2) in the buffer memory (DPRAM) (step S11).

The welding power-supply feedback signal (FB value 2) having been prepared for transmission is acquired by the robot welding power-supply control unit 43 through processing in step S19 described later. Be it noted that the welding power-supply feedback signal (FB value 2) has been input to the controller interface 41 before the processing of step S1.

Following the processing of step S11, the controller interface 41 outputs the welding power-supply control signal (command value 3), which has been input in step S5, to the welding power supply interface 32 (step S12).

Following the processing of step S12, the welding power supply interface 32 outputs the welding power-supply feedback signal (FB value 3), which has been acquired in step S3, to the controller interface 41 (step S13).

Following the processing of step S13, the robot welding power-supply control unit 43 outputs the welding power-supply sync signal to the controller interface 41 by generating a timer interrupt (step S14).

Following the processing of step S14, the controller interface 41 outputs the welding power-supply sync signal, which has been input in step S14, to the welding power supply interface 32 (step S15).

Following the processing of step S15, the welding power supply interface 32 acquires the welding power-supply feedback signal (FB value 4) by latching it in the buffer memory (step S16).

Following the processing of step S16, the robot welding power-supply control unit 43 outputs the welding power-supply control signal (command value 4) to the controller interface 41 (step S17).

Following the processing of step S17, the welding power supply interface 32 outputs the welding power-supply control signal (command value 3), which has been input in step S12, to the welding power-supply output unit 33 (step S18). Then, the welding power-supply output unit 33 applies the welding current and the welding voltage, which are commanded by the welding power-supply control signal (command value 3), to the welding wire 13.

Following the processing of step S18, the robot welding power-supply control unit 43 acquires the welding power-supply feedback signal (FB value 2) (step S19), which has been prepared for transmission in step S11.

Following the processing of step S19, the controller interface 41 prepares transmission of the welding power-supply feedback signal (FB value 3), which has been input in step S13. More specifically, the controller interface 41 stores the welding power-supply feedback signal (FB value 3) in the buffer memory (step S20).

Following the processing of step S20, the controller interface 41 outputs the welding power-supply control signal (command value 4), which has been input in step S17, to the welding power supply interface 32 (step S21).

Following the processing of step S21, the welding power supply interface 32 outputs the welding power-supply feedback signal (FB value 4), which has been acquired in step S16, to the controller interface 41 (step S22). Since the processing from step S1 to step S22 is repeated in the arc welding system 1, description of step S23 and subsequent ones is omitted.

Thus, in the arc welding system 1 according to the first embodiment of the present invention, the sampling intervals of the welding power-supply feedback signals (FB values 1 to 5) and the robot feedback position signal (FB value A and FB value B) can be always held constant by using the welding power-supply sync signal and the robot sync signal. More specifically, in the arc welding system 1 according to the first embodiment of the present invention, the welding power-supply feedback signals (FB values 1 to 5) can be acquired such that each of those signals is output in accordance with the welding power-supply sync signal preceding three cycles.

As a result, with the arc welding system 1 according to the first embodiment of the present invention, since the robot control signal to correct the position deviation of the welding torch 12 can be always output at the constant intervals by using the sync signal, accurate arc tracking can be carried out even in a serial system in which real-time performance is inferior to a parallel system. Also, with the arc welding system 1 according to the first embodiment of the present invention, since the welding power supply 30 and the controller 40 perform the communication using digital signals in a serial way, installation of an additional communication path is not required even when a new type of signal is added. Further, with the arc welding system 1 according to the first embodiment of the present invention, since a single line of communication path is employed and communication reliability is high, time and labor required for the complicated recovery process can be greatly reduced even if missing of signal data occurs, and frequency of the abnormality detection process can also be reduced. In addition, with the arc welding system 1 according to the first embodiment of the present invention, communication errors can be reduced because of using the CAN that is highly resistant against noises.

Second Embodiment

[Configuration of Arc Welding System: Tandem Arc Welding]

Figure 5:
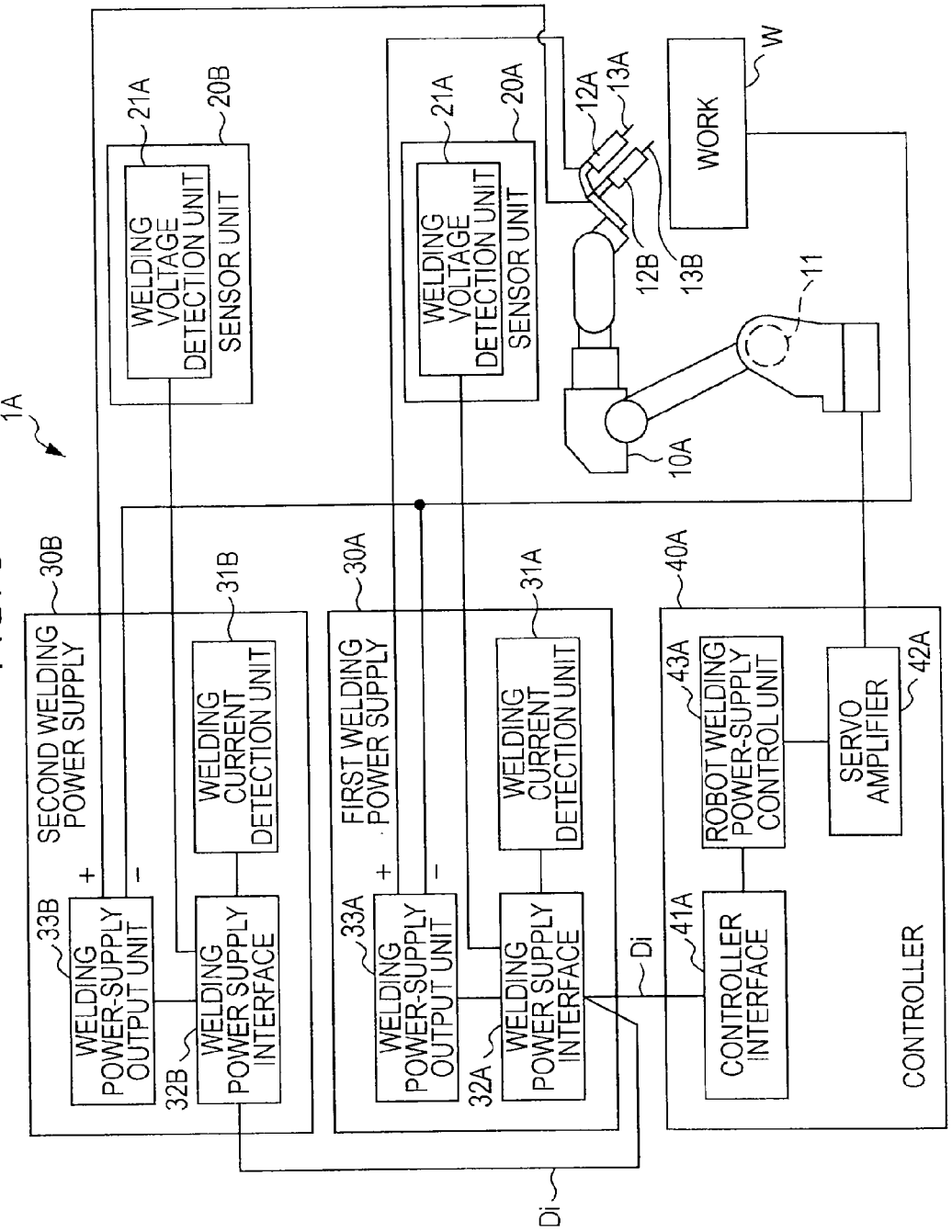
FIG. 5 is a block diagram illustrating configuration of an arc welding system according to a second embodiment of the present invention.

The configuration of an arc welding system (tandem arc welding system) 1A according to a second embodiment of the present invention is described with reference to FIG. 5. As illustrated in FIG. 5, the arc welding system 1A is to carry out tandem arc welding, and it includes a welding robot 10A, a sensor unit 20A, a sensor unit 20B, a first welding power supply 30A, a second welding power supply 30B, and a controller 40A.

The welding robot 10A includes a first welding torch 12A and a second welding torch 12B both mounted to an arm fore end thereof. The first welding torch 12A and the second welding torch 12B are each similar to the welding torch 12 in FIG. 1, and hence description of the welding torches 12A and 12B are omitted.

The sensor unit 20A includes a welding voltage detection unit 21A. The welding voltage detection unit 21A detects a welding voltage that is applied to a first welding wire 13A by a welding power-supply output unit 33A, and outputs a detected value of the welding voltage, as a welding voltage value detection signal, to a welding power supply interface 32A.

The sensor unit 20B includes a welding voltage detection unit 21B. The welding voltage detection unit 21B detects a welding voltage that is applied to a second welding wire 13B by a welding power-supply output unit 33B, and outputs a detected value of the welding voltage, as a welding voltage value detection signal, to a welding power supply interface 32B. The sensor unit 20A and the sensor unit 20B may include an electromagnetic contactor as described in the first embodiment.

The first welding power supply 30A supplies the welding power to the first welding wire 13A, and it includes a welding current detection unit 31A, the welding power supply interface 32A, and the welding power-supply output unit 33A.

The welding current detection unit 31A detects the welding current that is applied to the first welding wire 13A by the welding power-supply output unit 33A, and outputs a detected value of the welding current, as a welding current value detection signal, to the welding power supply interface 32A.

The welding power supply interface 32A performs communication using digital signals with respect to a later-described controller interface 41A via a digital communication path Di. Further, when signals are transmitted and received between a later-described welding power supply interface 32B and the controller interface 41A, the welding power supply interface 32A relays those signals therebetween via the digital communication path Di.

The welding power-supply output unit 33A outputs the welding power to the first welding wire 13A in accordance with the welding power-supply control signal input through the welding power supply interface 32A.

Be it noted that various means in the first welding power supply 30A are similar to those in the welding power supply 30 in FIG. 1, and hence description of those means is omitted.

The second welding power supply 30B supplies the welding power to the second welding wire 13B, and it includes a welding current detection unit 31B, the welding power supply interface 32B, and the welding power-supply output unit 33B.

The welding current detection unit 31B detects the welding current that is applied to the second welding wire 13B by the welding power-supply output unit 33B, and outputs a detected value of the welding current, as a welding current value detection signal, to the welding power supply interface 32B.

When signals are transmitted and received to and from the controller interface 41A, as illustrated in FIG. 5, the welding power supply interface 32B performs communication using digital signals with respect to the controller interface 41A via digital communication paths Di through the welding power supply interface 32A serving as a relay. Thus, in the arc welding system 1A, the first welding power supply 30A and the second welding power supply 30B are arranged in cascaded connection with respect to the controller 40A.

The welding power-supply output unit 33B outputs the welding power to the second welding wire 13B in accordance with the welding power-supply control signal input through the welding power supply interface 32B.

Be it noted that various means in the second welding power supply 30B are similar to those in the welding power supply 30 in FIG. 1, and hence description of those means is omitted.

The controller 40A controls the welding robot 10A, the first welding power supply 30A, and the second welding power supply 30B, and it includes the controller interface 41A, a servo amplifier 42A, and a robot welding power-supply control unit 43A.

The controller interface 41A performs communication using digital signals with respect to the welding power supply interface 32A and the welding power supply interface 32B via the digital communication path(s) Di. Here, the welding power supply interface 32A, the welding power supply interface 32B, and the controller interface 41A utilize, for example, the CAN to perform the communication using digital signals.

The robot welding power-supply control unit 43A has the arc tracking function and generates various signals that are necessary for controlling the welding robot 10A, the first welding power supply 30A, and the second welding power supply 30B.

Be it noted that various means in the controller 40A are similar to those in the controller 40 in FIG. 1, and hence description of those means is omitted.

[Operation of Arc Welding System: Synchronous Control]

The operation and the synchronous control of the arc welding system, illustrated in FIG. 5, will be described below with reference to FIG. 6 (and FIG. 5 as required). Be it noted that, in FIG. 6, the welding power-supply output unit 33A and the welding power-supply output unit 33B are each abbreviated to "output unit", the welding power supply interface 32A and the welding power supply interface 32B are each abbreviated to "welding power supply IF", the controller interface 41A is abbreviated to "controller IF", the robot welding power-supply control unit 43A is abbreviated to "control unit", the welding power-supply sync signal is abbreviated to "WP sync signal", and the robot sync signal is abbreviated to "R sync signal".

Figure 6:
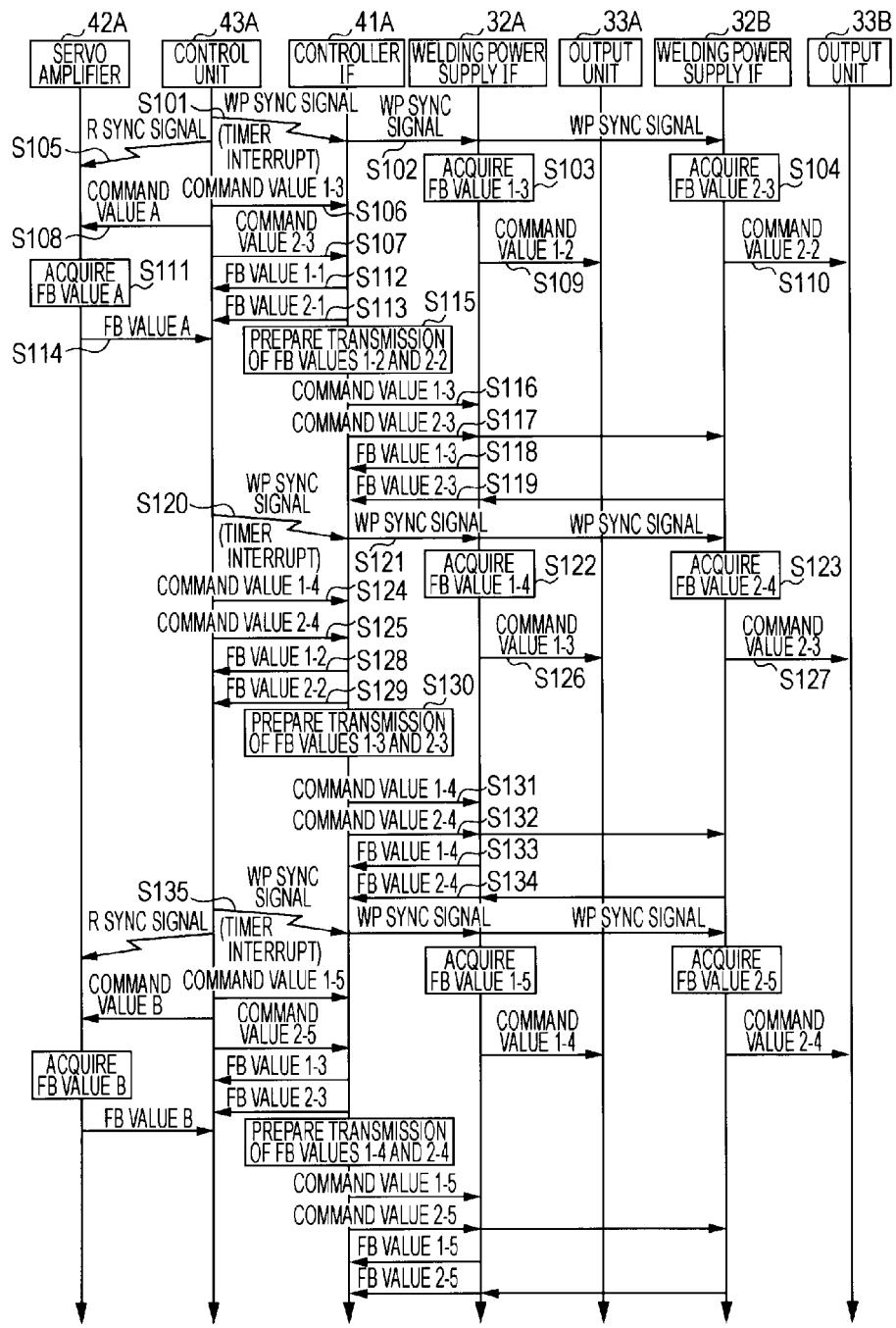
FIG. 6 is a sequence chart illustrating operations of the arc welding system of FIG. 5.

Further, in FIG. 6, each of "command value 1-1" to "command value 1-5" corresponds to the welding power-supply control signal applied to the welding power-supply output unit 33A, and each of "command value 2-1" to "command value 2-5" corresponds to the welding power-supply control signal applied to the welding power-supply output unit 33B. Also, each of "FB value 1-1" to "FB value 1-5" corresponds to the welding power-supply feedback signal from the welding power-supply output unit 33A, and each of "FB value 2-1" to "FB value 2-5" corresponds to the welding power-supply feedback signal from the welding power-supply output unit 33B. Further, in FIG. 6, each of "command value A" and "command value B" corresponds to the robot control signal, and each of "FB value A" and "FB value B" corresponds to the robot feedback position signal. The following description with reference to FIG. 6 is made on an assumption that the robot welding power-supply control unit 43A outputs the welding power-supply sync signal and the robot sync signal at arbitrary intervals. Additionally, the welding power-supply sync signal and the robot sync signal are preferably output at the interval of several to several tens milliseconds.

First, the robot welding power-supply control unit 43A outputs the welding power-supply sync signal to the controller interface 41A by generating a timer interrupt (step S101).

Following the processing of step S101, the controller interface 41A outputs the welding power-supply sync signal, which has been input in step S101, to the welding power supply interface 32A and further outputs the welding power-supply sync signal to the welding power supply interface 32B through the welding power supply interface 32A (step S102).

Following the processing of step S102, the welding power supply interface 32A acquires the welding power-supply feedback signal (FB value 1-3) by latching it in the buffer memory (step S103).

Following the processing of step S103, the welding power supply interface 32B acquires the welding power-supply feedback signal (FB value 2-3) by latching it in the buffer memory (step S104).

Following the processing of step S104, the robot welding power-supply control unit 43A outputs the robot sync signal to the servo amplifier 42A (step S105).

Following the processing of step S105, the robot welding power-supply control unit 43A outputs the welding power-supply control signal (command value 1-3) to the controller interface 41A (step S106).

Following the processing of step S106, the robot welding power-supply control unit 43A outputs the welding power-supply control signal (command value 2-3) to the controller interface 41A (step S107).

Following the processing of step S107, the robot welding power-supply control unit 43A outputs the robot control signal (command value A) to the servo amplifier 42A (step S108). Then, the servo amplifier 42A generates a drive signal for the servo motor 11 from the robot control signal (command value A) and drives the servo motor 11, thereby moving the welding torches 12A and 12B.

Following the processing of step S108, the welding power supply interface 32A outputs the welding power-supply control signal (command value 1-2) to the welding power-supply output unit 33A (step S109). Then, the welding power-supply output unit 33A applies the welding current and the welding voltage, which are commanded by the welding power-supply control signal (command value 1-2), to the first welding wire 13A. Be it noted that the welding power-supply control signal (command value 1-2) has been input to the welding power supply interface 32A before the processing of step S101.

Following the processing of step S109, the welding power supply interface 32B outputs the welding power-supply control signal (command value 2-2) to the welding power-supply output unit 33B (step S110). Then, the welding power-supply output unit 33B applies the welding current and the welding voltage, which are commanded by the welding power-supply control signal (command value 2-2), to the second welding wire 13B. Be it noted that the welding power-supply control signal (command value 2-2) has been input to the welding power supply interface 32B before the processing of step S101.

Following the processing of step S110, the servo amplifier 42A acquires the robot feedback position signal (FB value A) (step S111).

Following the processing of step S111, the controller interface 41A outputs the welding power-supply feedback signal (FB value 1-1) to the robot welding power-supply control unit 43A (step S112).

Following the processing of step S112, the controller interface 41A outputs the welding power-supply feedback signal (FB value 2-1) to the robot welding power-supply control unit 43A (step S113). Be it noted that the welding power-supply feedback signals (FB value 1-1 and FB value 2-1) have been input to the controller interface 41A before the processing of step S101.

Following the processing of step S113, the servo amplifier 42A outputs the robot feedback position signal (FB value A), which has been acquired in step S111, to the robot welding power-supply control unit 43A (step S114). Then, the robot welding power-supply control unit 43A generates the robot control signal (command value B) to correct the position deviation of the welding torch 12 by using both the welding power-supply feedback signal (FB value 1-1), which has been input in step S112, and the welding power-supply feedback signal (FB value 2-1), which has been input in step S113.

Following the processing of step S114, the controller interface 41A prepares transmission of the welding power-supply feedback signals (FB value 1-2 and FB value 2-2). More specifically, the controller interface 41A stores the welding power-supply feedback signals (FB value 1-2 and FB value 2-2) in the buffer memory (step S115).

The welding power-supply feedback signals (FB value 1-2 and FB value 2-2) having been prepared for transmission are acquired by the robot welding power-supply control unit 43A through processing in steps S128 and S129 described later. Be it noted that the welding power-supply feedback signals (FB value 1-2 and FB value 2-2) have been input to the controller interface 41A before the processing of step S101.

Following the processing of step S115, the controller interface 41A outputs the welding power-supply control signal (command value 1-3), which has been input in step S106, to the welding power supply interface 32A (step S116).

Following the processing of step S116, the controller interface 41A outputs the welding power-supply control signal (command value 2-3), which has been input in step S107, to the welding power supply interface 32B through the welding power supply interface 32A (step S117).

Following the processing of step S117, the welding power supply interface 32A outputs the welding power-supply feedback signal (FB value 1-3), which has been acquired in step S103, to the controller interface 41A (step S118).

Following the processing of step S118, the welding power supply interface 32B outputs the welding power-supply feedback signal (FB value 2-3), which has been acquired in step S104, to the controller interface 41A through the welding power supply interface 32A (step S119).

Following the processing of step S119, the robot welding power-supply control unit 43A outputs the welding power-supply sync signal to the controller interface 41A by generating a timer interrupt (step S120).

Following the processing of step S120, the controller interface 41A outputs the welding power-supply sync signal, which has been input in step S120, to the welding power supply interface 32A, and further outputs the welding power-supply sync signal to the welding power supply interface 32B through the welding power supply interface 32A (step S121).

Following the processing of step S121, the welding power supply interface 32A acquires the welding power-supply feedback signal (FB value 1-4) by latching it in the buffer memory (step S122).

Following the processing of step S122, the welding power supply interface 32B acquires the welding power-supply feedback signal (FB value 2-4) by latching it in the buffer memory (step S123).

Following the processing of step S123, the robot welding power-supply control unit 43A outputs the welding power-supply control signal (command value 1-4) to the controller interface 41A (step S124).

Following the processing of step S124, the robot welding power-supply control unit 43A outputs the welding power-supply control signal (command value 2-4) to the controller interface 41A (step S125).

Following the processing of step S125, the welding power supply interface 32A outputs the welding power-supply control signal (command value 1-3), which has been input in step S116, to the welding power-supply output unit 33A (step S126).

Following the processing of step S126, the welding power supply interface 32B outputs the welding power-supply control signal (command value 2-3), which has been input in step S117, to the welding power-supply output unit 33B (step S127).

Following the processing of step S127, the controller interface 41A outputs the welding power-supply feedback signal (FB value 1-2) to the robot welding power-supply control unit 43A (step S128).

Following the processing of step S128, the controller interface 41A outputs the welding power-supply feedback signal (FB value 2-2) to the robot welding power-supply control unit 43A (step S129). Be it noted that the welding power-supply feedback signals (FB value 1-2 and FB value 2-2) have been input to the controller interface 41A before the processing of step S101.

Following the processing of step S129, the controller interface 41A prepares transmission of the welding power-supply feedback signals (FB value 1-3 and FB value 2-3). More specifically, the controller interface 41A stores the welding power-supply feedback signals (FB value 1-3 and FB value 2-3) in the buffer memory (step S130).

Following the processing of step S130, the controller interface 41A outputs the welding power-supply control signal (command value 1-4), which has been input in step S124, to the welding power supply interface 32A (step S131).

Following the processing of step S131, the controller interface 41A outputs the welding power-supply control signal (command value 2-4), which has been input in step S125, to the welding power supply interface 32B through the welding power supply interface 32A (step S132).

Following the processing of step S132, the welding power supply interface 32A outputs the welding power-supply feedback signal (FB value 1-4), which has been acquired in step S122, to the controller interface 41A (step S133).

Following the processing of step S133, the welding power supply interface 32B outputs the welding power-supply feedback signal (FB value 2-4), which has been acquired in step S123, to the controller interface 41A through the welding power supply interface 32A (step S134). Since the processing from step S101 to step S134 is repeated in the arc welding system 1A, description of step S135 and subsequent ones is omitted.

Thus, in the arc welding system 1A according to the second embodiment of the present invention, the welding power supply interface 32A, the welding power supply interface 32B, and the controller interface 41A perform the communication using digital signals via the digital communication path(s) Di. In the arc welding system 1A according to the second embodiment of the present invention, therefore, the sampling intervals can be always held constant as in the first embodiment. In addition, even when there is a lag in communication time between each of the welding power supply interface 32A and the welding power supply interface 32B and the controller interface 41A, the feedback signals detected at the same time can be acquired from the respective welding power-supply feedback signals detected by the welding power supply interface 32A and the welding power supply interface 32B. Accordingly, even in the tandem arc welding carried out by the arc welding system 1A according to the second embodiment of the present invention, the robot control signals to correct the position deviations of the welding torch 12A and the welding torch 12B can be always output at constant intervals and hence accurate arc tracking can be performed. Further, in the arc welding system 1A according to the second embodiment of the present invention, communication errors can be reduced because of using the CAN that is highly resistant against noises, as in the first embodiment.

In the present invention, the order of individual steps in FIGS. 4 and 6 can be replaced depending on the intervals at which the welding power-supply sync signal and the robot sync signal are output.

While the first and second embodiments of the present invention have been described in connection with an example utilizing the CAN to perform the communication using digital signals, the communication method is not limited to the above-described one. In addition to the CAN, the present invention can further utilize RS-232C, Universal Serial Bus (USB), Serial Peripheral Interface (SPI), Inter Integrated Circuit (I2C), and Ethernet (registered trademark) to perform the communication using digital signals.

EXAMPLE 1

EXAMPLES of the arc welding system described above in the second embodiment will be described below.
(Priority)
Frame priority will be described below as EXAMPLE 1 with reference to FIG. 7 when the CAN is employed as communication means. Be it noted that, in FIG. 7, other means in an arc welding system 1C according to the present invention than the first welding power supply 30A, the second welding power supply 30B, and the controller 40A are omitted.

Figure 7:
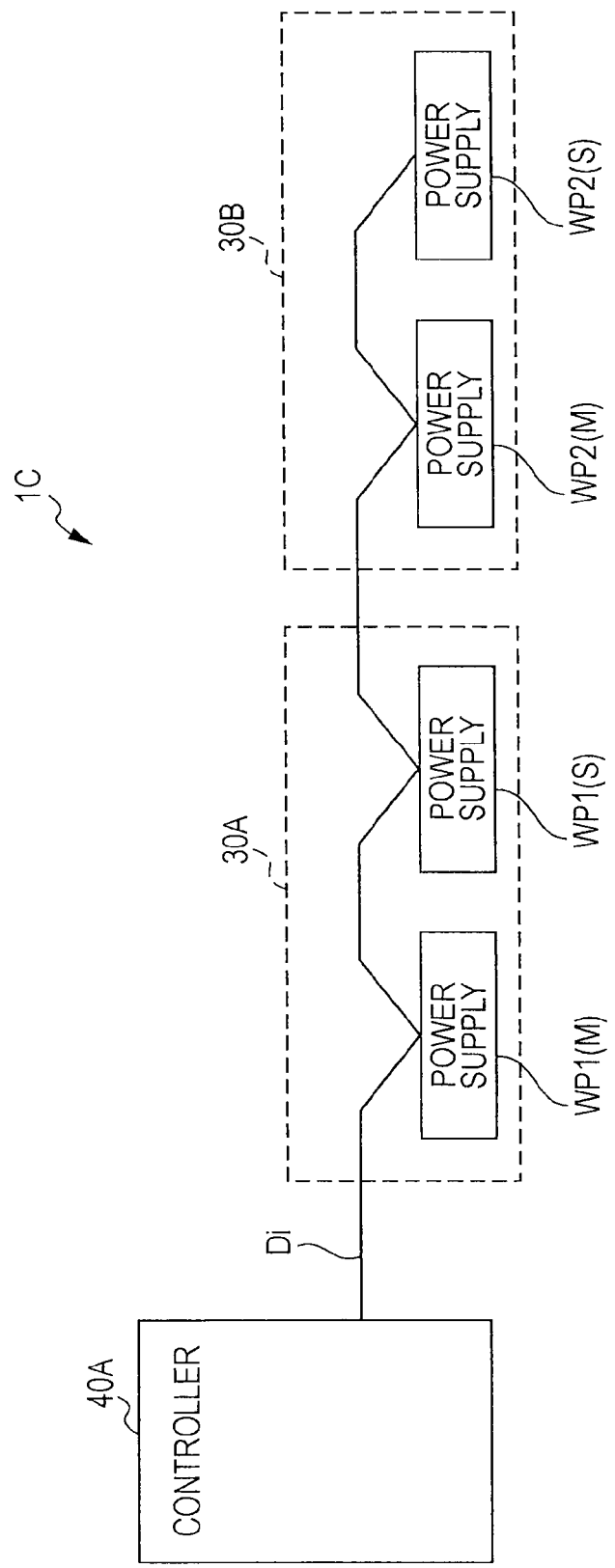
FIG. 7 is an illustration to explain EXAMPLE 1 of the present invention.

In the arc welding system 1C of FIG. 7, tandem arc welding is carried out by outputting powers from a pair of two power supplies to one welding wire (one pole) in parallel and by employing two pairs of power supplies for two poles. More specifically, in the arc welding system 1C, the first welding power supply 30A is constituted by two power supplies (denoted by WP1(M) and WP1(S) hereinafter), and the second welding power supply 30B is constituted by two power supplies (denoted by WP2(M) and WP2(S) hereinafter).

Priority is set depending on a level of importance of communication data transferred between the controller and each of the welding power supplies. The priority is assumed to gradually lower in the order of Priority 1, 2 and 3 from the top Priority 1. For example, because the welding current value necessary for the tracking is data having a high level of importance, it is given with high priority. A frame is employed depending on the priority. In the arc welding system 1C, though not illustrated, the controller interface and each welding power supply interface put various signals and data in respective frames corresponding to different priorities, and transmit and receive the frames.

Thus, in the arc welding system 1C according to EXAMPLE 1 of the present invention, the welding power-supply sync signal and the welding power-supply feedback signal for which high real-time performance is required are each put in the frame corresponding to high priority. As a result, transmission and reception of the welding power-supply sync signal and the welding power-supply feedback signal at arbitrary sampling intervals are realized in the arc welding system 10 according to EXAMPLE 1 of the present invention. Be it noted that priority setting in the present invention is not limited to the one described above as EXAMPLE 1. Further, it is needless to say that, in the present invention, the priority setting described in EXAMPLE 1 can be applied to the single arc welding as well.

EXAMPLE 2

(Verification of Synchronous Control)
The verification result of the synchronous control necessary for the arc tracking will be described below as EXAMPLE 2 (with reference to FIG. 1 as required)). More specifically, verification was conducted by inputting a sine wave (signal waveform $\alpha$), which simulates the detected value of the welding current, to the welding current detection unit 31 in FIG. 1, and by measuring waveforms in the various means. The measurement results are illustrated in FIG. 8.

Figure 8:
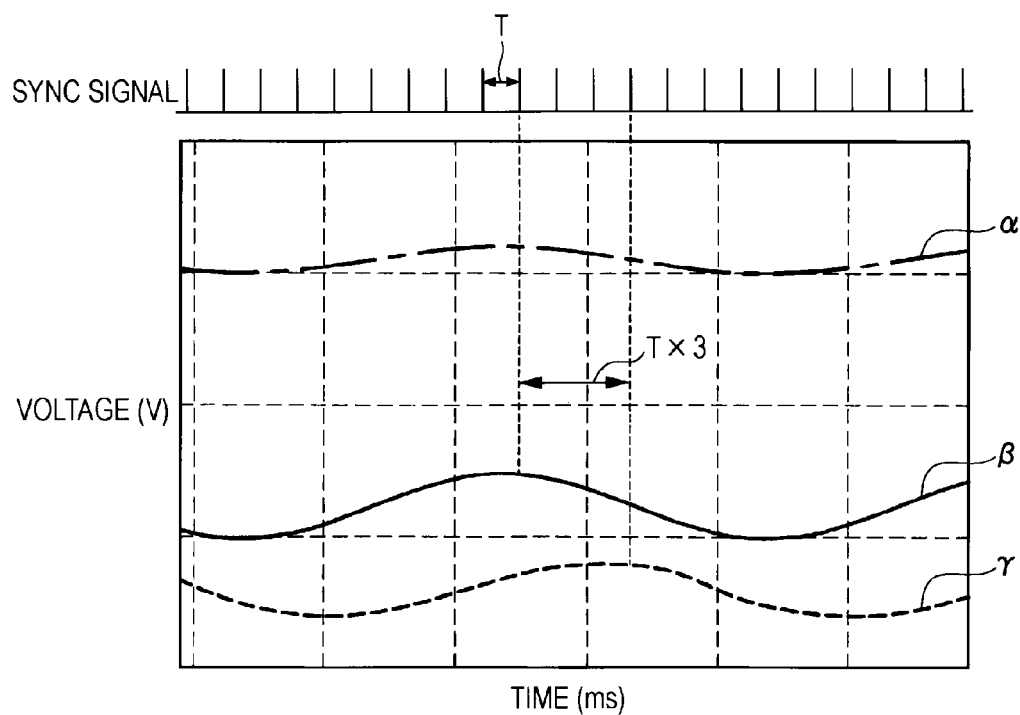
FIG. 8 is a graph illustrating signal waveforms in EXAMPLE 2 of the present invention.
Figure 9:
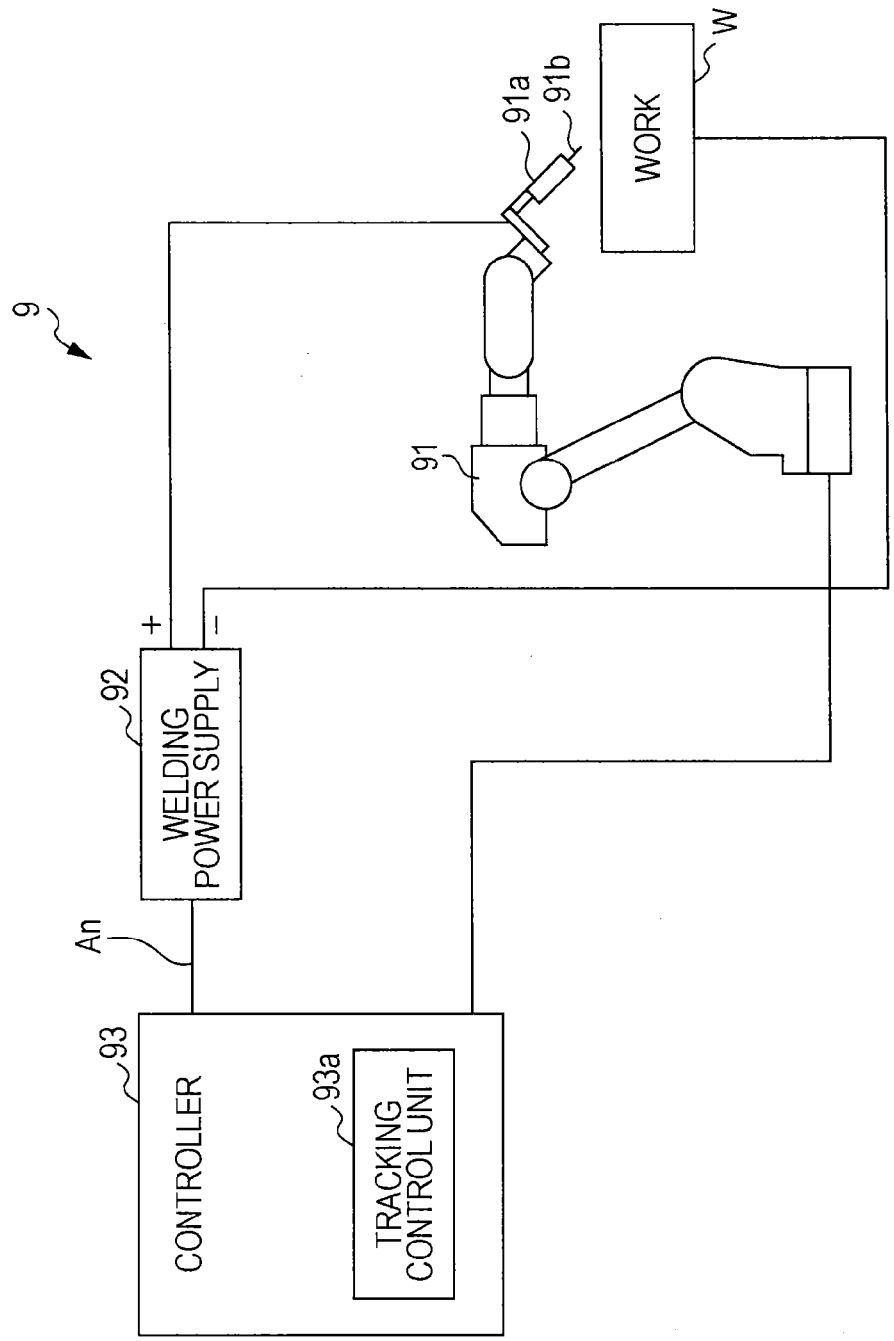
FIG. 9 is a block diagram illustrating configuration of a known arc welding system.

FIG. 8 illustrates three waveforms, i.e., the signal waveform $\alpha$ (one-dot-chain line), a signal waveform $\beta$ (solid line), and a signal waveform $\gamma$ (broken line). The signal waveform $\alpha$ represents the sine wave input to the welding current detection unit 31. The signal waveform $\beta$ represents a waveform after filtering in the welding current detection unit 31. Further, the signal waveform $\gamma$ represents a waveform obtained at the time when the controller 40 receives the input sine wave as the welding power-supply feedback signal. Be it noted that, in FIG. 8, the vertical axis indicates voltage and the horizontal axis indicates time. Also, a character T in FIG. 8 indicates an interval at which the robot welding power-supply control unit 43 outputs the welding power-supply sync signal (i.e., a time interval representing one cycle from S1 to S14 in FIG. 4).

As illustrated in FIG. 8, the cycle of the signal waveform $\gamma$ is delayed from the cycle of the signal waveform $\beta$ by T×3. Thus, it was confirmed that the controller 40 acquired the welding power-supply feedback signal output corresponding to the welding power-supply sync signal preceding three cycles.

Thus, it is understood that, in the arc welding system 1 according to EXAMPLE 2 of the present invention, the synchronous control in the arc tracking is realized while ensuring that synchronization in switching of welding conditions and synchronization in timing of turning on an arc are held constant in terms of time.

What is claimed is:
1. An arc welding system comprising:
a welding robot;
a welding torch mounted to an arm fore end of the welding robot;
a welding power supply connected to the welding torch and supplying welding power to a welding wire; and
a controller for controlling the welding power supply,
wherein the welding power supply includes:
a welding current detection unit for detecting a welding current value of the welding wire and outputting a welding current value detection signal representing the welding current value;
a welding power supply interface for receiving, from the controller, a welding power-supply control signal to control the welding power supply and a welding power-supply sync signal that is supplied as a sync signal to the welding power supply at intervals of certain time, receiving the welding current value detection signal from the welding current detection unit, and outputting to the controller, as a welding power-supply feedback signal, the welding current value detection signal obtained at the time of inputting of the welding power-supply sync signal; and a welding power supply output unit for outputting the welding power in accordance with the welding power-supply control signal input through the welding power supply interface, wherein the welding power supply controller includes:

a controller interface connected to the welding power supply interface via a Controller Area Network (CAN) for receiving the welding power-supply feedback signal from the welding power supply, and outputting the welding power-supply control signal and the welding power-supply sync signal to the welding power supply in a frame that is transmitted and received at constant intervals;

a servo amplifier connected to the welding robot for controlling driving of the welding robot in accordance with a robot control signal for controlling the welding robot, and outputting a robot feedback position signal representing a position of the welding torch at the time of inputting of a robot sync signal as a sync signal for the welding robot; and a robot welding power-supply control unit for generating the welding power-supply sync signal and the robot sync signal, outputting the welding power-supply sync signal and the welding power-supply control signal to the controller interface, detecting a position deviation of the welding torch from the welding power-supply feedback signal, which is the welding current value detection signal obtained at the time of inputting of the welding power-supply sync signal, and the robot feedback position signal, both input during arc welding, generating the robot control signal to correct the position deviation of the welding torch, and outputting the generated robot sync signal and robot control signal to the servo amplifier, and wherein the welding power supply and the controller are connected in a serial way and communicate with each other using digital signals.

2. The arc welding system according to claim 1, wherein the welding power supply interface further receives a welding voltage value detection signal detected by a welding voltage detection unit and representing a welding voltage value of the welding wire, and outputs to the controller, as the welding power-supply feedback signal, at least one of the welding current value detection signal and the welding voltage value detection signal each obtained at the time of inputting of the welding power-supply sync signal.

3. The arc welding system according to claim 1, wherein the arc welding system is a single arc welding system in which the welding torch mounted to the arm fore end of the welding robot is single.

4. The arc welding system according to claim 1, wherein the arc welding system is a tandem arc welding system in which the welding torch mounted to the arm fore end of the welding robot comprises a first welding torch and a second welding torch behaving in a similar manner to the first welding torch, wherein the welding power supply is provided two or more, including at least a first welding power supply and a second welding power supply, wherein the first welding power supply connected to the first welding torch supplies the welding power to the welding wire as a first one and performs communication using digital signals with respect to the controller in a serial way, wherein the second welding power supply connected to the second welding torch supplies the welding power to a second welding wire and performs communication using digital signals with respect to the controller in a serial way, and wherein the controller controls the welding robot, the first welding power supply, and the second welding power supply.

* * * * *